A. WING.
Dressing Millstones.
No. 46,963.  Patented March 21, 1865.
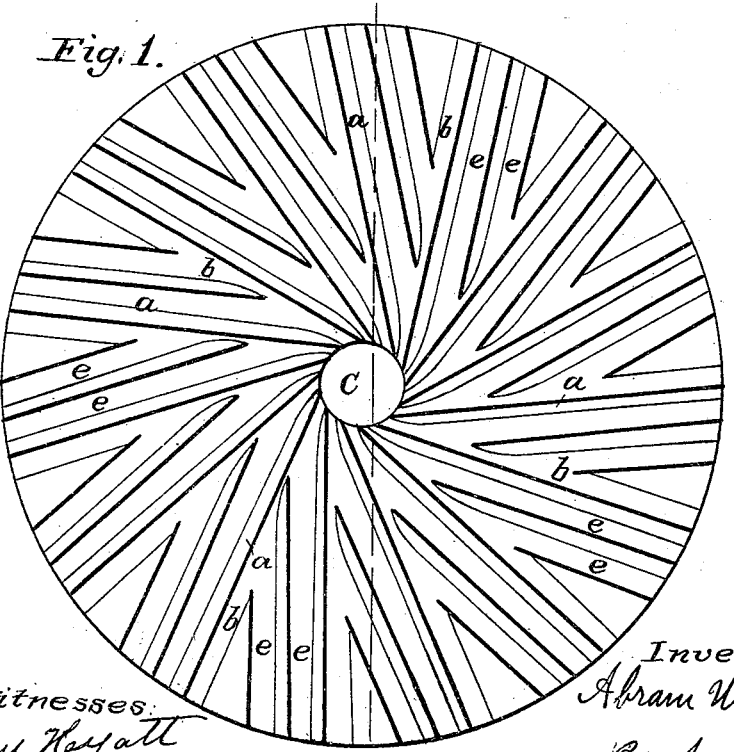

UNITED STATES PATENT OFFICE.

ABRAM WING, OF MAYVILLE, NEW YORK.

IMPROVEMENT IN DRESSING MILLSTONES.

Specification forming part of Letters Patent No. 46,963, dated March 21, 1865.

*To all whom it may concern:*

Be it known that I, ABRAM WING, of Mayville, in the county of Chautauqua and State of New York, have invented a new and useful Improvement in Dressing Millstones; and I do hereby declare that the following is a full and exact description thereof, reference being had to the accompanying drawings, making part of this specification, in which—

Figure 1 is a plan view of a runner-stone, inverted, having my improved dress. Fig. 2 is a vertical section of the same on the line $x\ x$ of Fig. 1, showing the form of furrows $b\ i$. Fig. 3 is a vertical section of a portion of a pair of millstones dressed in the usual manner, showing the feed opening or bosom $h$.

Like letters designate corresponding parts in all of the drawings.

My improvement has a twofold object—viz., to effect the grinding as near to the eye as possible, thereby saving the power required for driving the stone, and by so doing to carry off the flour in the furrows and prevent its keeping between the lands of the stone as it approaches the periphery, whereby over-grinding is produced, from greater friction and longer retaining of it between those parts of the stone which revolve the most rapidly.

In the ordinary mode of dressing millstones for grinding wheaten flour the "lands" run of equal width and form parallel lines from the periphery to the eye of the stone, consequently leaving the furrows of equal width and parallel with the lands. In my improvement I take from the lands or surface of the stone $a$, and consequently widen the furrows as they approach the center.

The furrows in my method consist of two series, the leading furrows $b\ b$, which diverge tangentially from the eye C outward to the periphery, diminishing slightly in width, and parallel with each of these are two or more auxiliary furrows, $e\ e$, which fill the angular space between the leading furrows, and which are rendered shorter by their intersection with the next contiguous furrow. The bottoms of both incline, as at $i\ i$.

The lands between the furrows $b\ b$ extend to the eye C, thereby carrying the plane of the stone fully up to the eye, at which point the furrows are made deep enough for the grain to enter, whereas it is customary to lower or reduce this surface around the eye for a short distance below the common plane of the lands to a depth equal to or greater than that of the furrows themselves. This opening or hollow is called the "bosom," and its object is to facilitate the entrance of the grain between the stones; but by my plan of dressing this is rendered wholly unnecessary, and its evils obviated. The result of this old method is, that much of the grain enters by the wedging space $h$, Fig. 3, between the lands near the eye, and is subjected to the friction of the stones until it is discharged at the periphery or escapes into the furrows, thus over-grinding the flour and destroying the fermentative properties of the starch and gluten by the heat induced by so much friction, until it will not make good bread. The kernels should not be pulverized between the lands, but between the sloping or inclined sides $i$ of the furrows, by which means the starch globules remain unbroken and the gluten uninjured by the heat generated through friction, and this is accomplished by the method of dress which I have invented and described—viz., of furrows which, while they diminish from the eye to the periphery, yet retain a narrow portion of the land between the periphery and eye, the object being to make the lands act as guides at the eye to direct the grain into the furrows, and to diminish, as far as practicable, the amount of land surface, so that the grinding may be effected in the furrows to the greatest possible extent. It is obvious that with this form of dress the grain will be chiefly ground near the eye, requiring less expenditure of power than where it is first cracked in the bosom and pulverized for the whole extent or diameter of the stone, as in the old method.

I am aware that in the many methods of dressing millstones there are some having furrows running tangentially from the eye to the periphery; but I am not aware of any having the precise form and arrangement of the lands $a$ and furrows $b$ and $e$, by which the useful results which I have described are produced.

What I claim as my invention, and desire to secure by Letters Patent, is—

The described method of dressing millstones, consisting of the narrowed lands $a$, extending in full height to the eye C, in combination with the tangential and intermediate inclined furrows $b$ and $e\ e$, widened toward the eye, and gradually narrowing outward to the periphery of the stone, substantially as and for the purposes herein specified.

In witness whereof I have hereunto signed my name in the presence of two subscribing witnesses.

ABRAM WING.

Witnesses:
  A. D. MORTON,
  JOHN M. SEYMOUR.